(No Model.) 3 Sheets—Sheet 1.

G. E. DORMAN.
DYNAMO ELECTRIC MACHINE.

No. 585,379. Patented June 29, 1897.

Witnesses.

Inventor
George Edensor Dorman

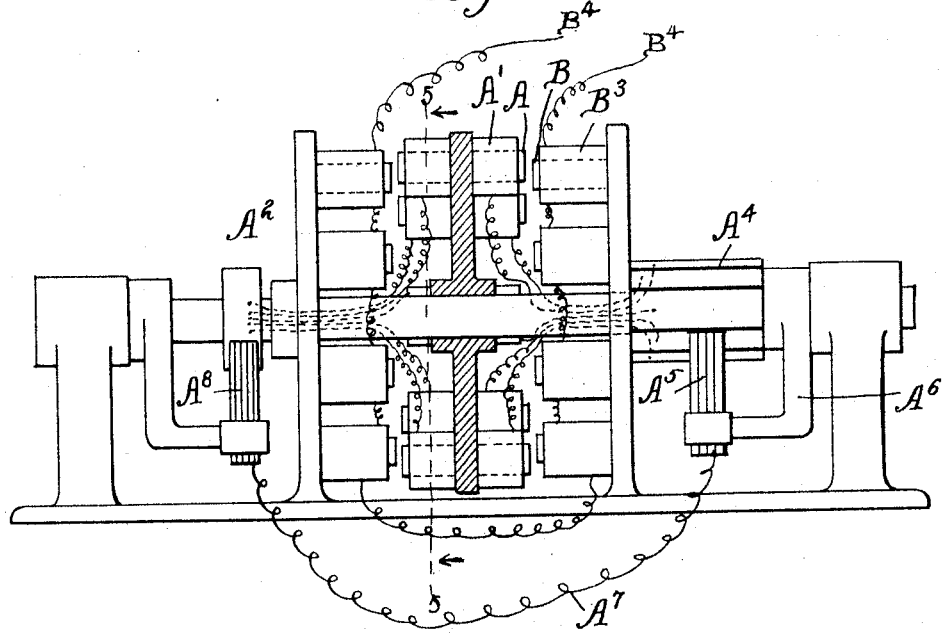
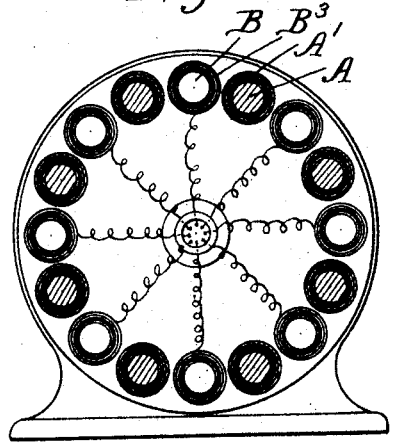

(No Model.) 3 Sheets—Sheet 3.
G. E. DORMAN.
DYNAMO ELECTRIC MACHINE.
No. 585,379. Patented June 29, 1897.
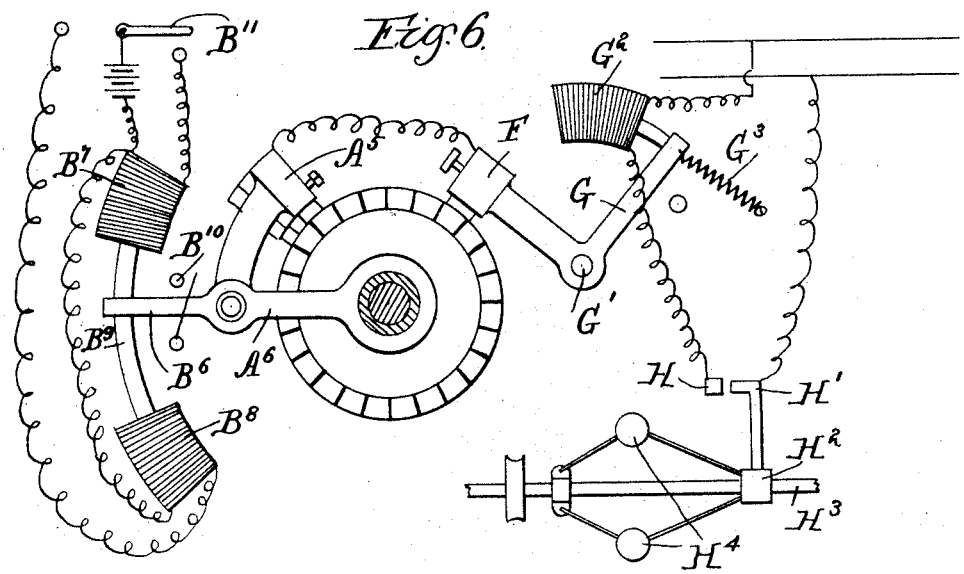
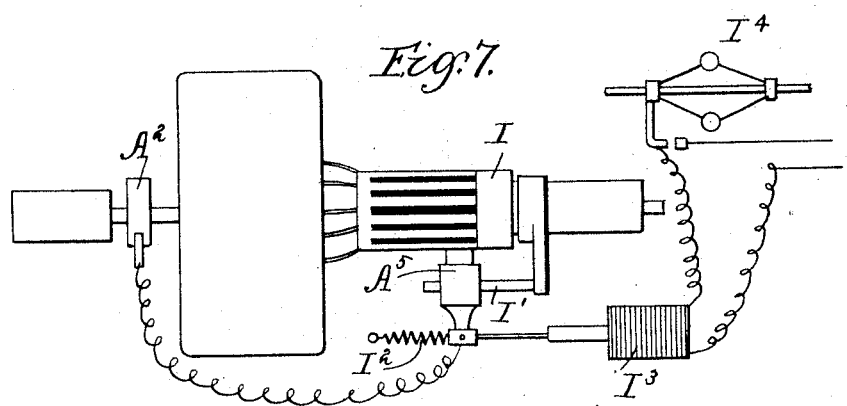
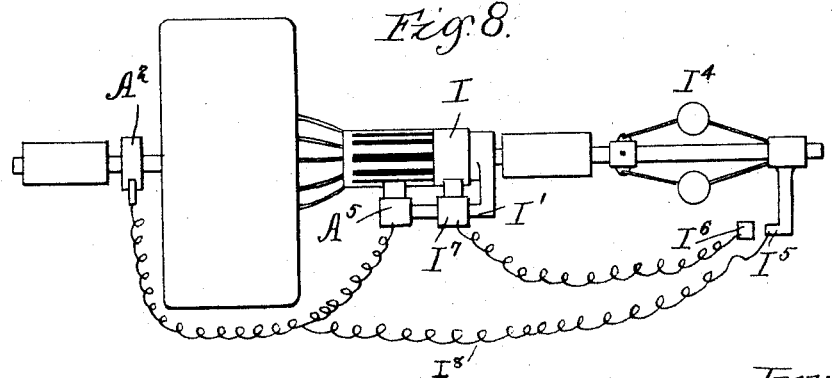
Witnesses. Inventor
George Edensor Dorman

UNITED STATES PATENT OFFICE.

GEORGE EDENSOR DORMAN, OF CHICAGO, ILLINOIS, ASSIGNOR TO JOHN EHRENFRIED DORMAN, OF SAME PLACE.

DYNAMO-ELECTRIC MACHINE.

SPECIFICATION forming part of Letters Patent No. 585,379, dated June 29, 1897.

Application filed February 4, 1896. Serial No. 578,070. (No model.)

*To all whom it may concern:*

Be it known that I, GEORGE EDENSOR DORMAN, a subject of the Queen of Great Britain, residing at Chicago, in the county of Cook and State of Illinois, have invented certain Improvements in Dynamo-Electric Machines, of which the following is a specification.

My invention relates to dynamo-electric machines, and particularly to such machines when used to be operated as motors.

The object of my invention is to provide a new and improved motor particularly adapted to be operated by single-phase alternating currents.

My invention is illustrated in the accompanying drawings, wherein—

Figure 1:
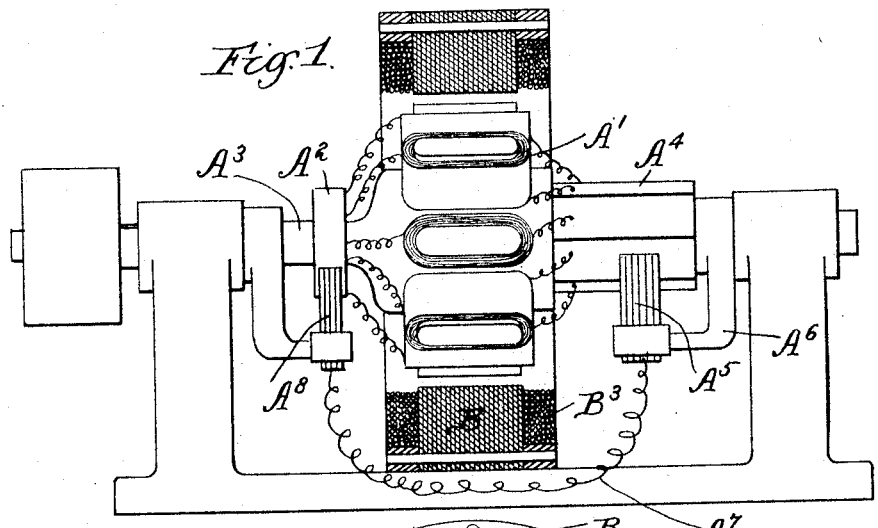
Figure 2:
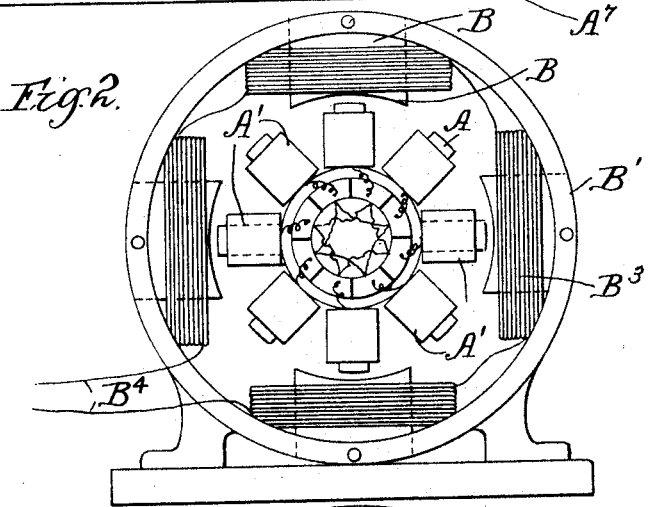
Figure 3:
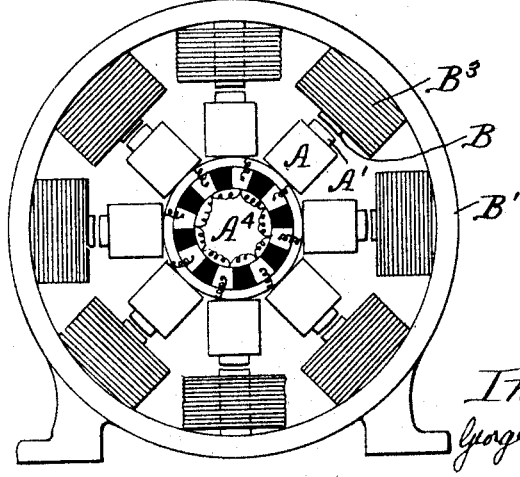

Figure 1 is a side elevation, in part section, of a machine embodying my invention. Fig. 2 is an end elevation of the same. Fig. 3 is an enlarged elevation of a motor having a large number of field-coils. Fig. 4 is a side elevation of a machine embodying my invention in which the field magnet and armature are differently disposed. Fig. 5 is a section on line 5 5, Fig. 4. Fig. 6 is a diagrammatic view showing a means for reversing the motor at a distance and of continuously short-circuiting all the coils when the motor reaches its normal speed. Fig. 7 shows a mechanism by which all the armature-coils are automatically short-circuited when the motor reaches normal speed. Fig. 8 shows a modified construction for obtaining the same result.

Like letters refer to like parts throughout the several figures.

The armature of my machine is provided with the projecting poles A A, connected with a central hub or spider, said poles being each provided with a coil of wire $A'$.

The field-magnets B B are arranged around the armature, and, as shown in the drawings, are connected to the frame $B'$. One end of each of the armature-coils $A'$ is connected to the collecting-ring $A^2$ on the armature-shaft $A^3$. The other end of each of said coils is connected to one of the sections of the commutator $A^4$, each end being connected to a separate section so as to be insulated one from the other. A brush $A^5$ is connected with a movable arm $A^6$, and is adapted to bear upon the commutator $A^4$. A wire $A^7$ connects said brush with a brush $A^8$, bearing upon the collecting-ring $A^2$.

The poles and the field-magnet are constructed of laminated iron in any desirable manner. As shown in the drawings, they consist of a series of plates connected together and held in position in the frame by means of bolts or rods. The motor shown in Figs. 1 and 2 is provided with magnet-poles, the armature having eight poles. In this construction the pole-pieces of the field-magnet are made wide, so that as one armature-pole leaves the pole-piece another passes beneath it.

The machine shown in Fig. 3 is provided with eight field-magnet poles, one for each pole of the armature.

It is evident that I may vary the number of poles of the field-magnets or of the armature, and I have shown these two constructions in order to make this fact clear. In a multipolar field I connect the commutator-bars, in equivalent positions with regard to the fields, together. In a machine having a field-magnet pole for each armature-pole I connect all of the bars of the commutator together, as shown in Fig. 3. In a machine having twice as many armature-poles as there are field-poles I connect the alternate bars of the commutator together, as shown in Fig. 2. When all the bars of the commutators are connected together I prefer to provide large insulating-pieces between said bars, the insulation being preferably the same width as the segment.

I have represented in Figs. 4 and 5 a machine in which the field-magnets and armature are disposed in a manner different from the field-magnets and armature shown in Fig. 1. The operation of this motor is similar in every respect to that of Fig. 1. The field-magnet coils $B^3$ are connected by the wires $B^4$ with a source of electrical supply, there being no connection between the armature and such source of electrical supply.

As will be hereinafter more fully explained, the motor may be reversed by moving the brush $A^5$ upon the commutator. This may be done by hand or by some suitable mechanism which may be operated from a distance.

I have shown in Fig. 6 a mechanism by which the brush may be moved from a point distant from the motor, so as to reverse such motor. In this construction the brush $A^5$ consists of several brushes placed side by side and arranged in a radial position, so that the armature may be rotated in either direction. The arm $A^6$, to which the brush is connected, is provided with a projecting part B. Two solenoids $B^7$ $B^8$ are provided with a core $B^9$, which is connected with the part or arm $B^6$. The motion of said arm is limited by means of the stops $B^{10}$. The circuits from the solenoids are run to the point from which the motor is to be operated, and are provided with a switch $B^{11}$, by which the circuit may be completed through either solenoid at will. It will therefore be seen that the position of the brush may be controlled by means of the switch $B^{11}$, the arm $A^6$ being held in any desired position by friction at the point where it is supported.

I have found that after the motor has been started it normally reaches a speed synchronous with that of the generator. It is therefore desirable after the motor has reached its normal speed to continuously short-circuit all the armature-coils. This may be done by hand or may be done automatically when the motor has reached the required speed. In Figs. 6, 7, and 8 I have shown means of automatically accomplishing this result. In machines where there is a difference in the number of poles in the armature and field-magnet I may accomplish this result by means of a second brush upon the commutator, said brush, with the aid of the brush $A^5$, keeping the coils all continuously short-circuited.

As shown in the drawings, the brush F is placed upon one end of a bell-crank lever G, pivoted at G'. A magnet or solenoid $G^2$ is located near the other end of said lever, the core of said solenoid being connected with the lever, as shown. A spring $G^3$ normally holds said lever in such a position that the brush is not in contact with the commutator. The brushes $A^5$ and F are electrically connected together. The magnet $G^2$ is connected to a source of electrical supply and to a contact-point H. A second contact-point H' is connected to the other pole of the source of electrical supply. The contact H' is connected with a sleeve $H^2$, loosely mounted on a shaft $H^3$, which is run by means of a belt from the motor-shaft. The sleeve $H^2$ is connected with the governor-balls $H^4$, so as to be moved along the shaft as the position of said governor-balls vary. The parts are so regulated that the contacts H and H' are brought together when the motor has reached its normal speed. When these contacts come together, the circuit is completed through the magnet or solenoid $G^2$ and the brush F is moved into contact with the commutator.

As shown in Fig. 7, a ring I is placed at one end of the commutator and is in contact with all of the bars thereof. The brush $A^5$ is arranged upon an arm I', so as to be free to move therealong, and is normally held away from the ring I by means of the spring $I^2$. A solenoid $I^3$ is provided with a core which is connected with the brush $A^5$. This solenoid or magnet is connected to a source of electrical supply through the governor $I^4$ in a manner similar to that shown in Fig. 6. Before the motor reaches normal speed the brush $A^5$ will be on the commutator and will be out of contact with the ring I. As soon as it reaches normal speed the circuit will be completed through the magnet or solenoid $I^3$ and the brush will be moved in contact with ring I, thereby continuously short-circuiting all the armature-coils.

As shown in Fig. 8, governor $I^4$ is placed directly upon the armature-shaft and is provided with a contact $I^5$, which is normally held out of contact with an opposed contact $I^6$ until the motor has reached its normal speed. A brush $I^7$ is supported upon the arm I' and is normally in contact with the ring I, which short-circuits the segments of the commutator. The brush $I^7$ is provided with a conductor or wire by which it is connected with the contact $I^6$. The contact $I^5$ is connected by means of wire $I^8$ to the wire which connects the brush on the commutator with the brush on the ring $A^2$. The governor is arranged so that the contacts $I^5$ and $I^6$ are kept apart until the motor reaches a normal speed, whereupon they are brought into contact with each other, and the brush $I^7$ is electrically connected to wire $I^8$ and is in circuit with the armature-coils. It will therefore be seen that said armature-coils will be continuously short-circuited. If the speed of the motor decreases, the contacts $I^5$ and $I^6$ are separated and the brush $I^7$ is cut out of circuit with the armature-coils.

There may be any number of armature-poles, preferably a multiple of the field-poles.

The magnets as described herein for operating brush-moving or circuit-closing devices may be operated by alternating currents from the main circuit, the magnet-coils and armatures being laminated, as is well understood.

I have described these several parts in detail; but it is evident that they may be greatly varied in form, construction, and arrangement without departing from the spirit of my invention, and I therefore do not wish to be limited to the exact construction shown.

The use and operation of my invention are as follows:

When it is desired to start the motor, the circuit is completed through the field-magnet coils, thereby magnetizing the poles B B. As these poles are magnetized, they attract the poles A of the armature and tend to move or rotate such armature. This of itself is not sufficient to produce a rotation of the armature, as the movement will stop when the poles of the armature come opposite the center of or within the area of the poles of the field-magnet. This result is obviated by short-circuiting the coils on the armature at a predetermined time and when in a predetermined position by means of the commutator $A^4$, ring $A^2$, and the connected brushes thereon. Since the current in the field-coils is an alternating current, it will induce a current in the coils of the armature when such coils are short-circuited and the field-magnet pole will then repel the armature-pole.

Referring now to Figs. 1 and 2, the several parts are arranged so that the four armature-coils opposite the field-magnet pole are short-circuited simultaneously when at one side of the center of said pole-pieces or when on the verge of passing out of said pole-piece. The poles are first attracted by magnetic force until they reach a predetermined position. The coils thereon are then short-circuited and the induced current produced causes the field-magnet pole to repel the armature-pole, and hence the armature continues to move in the same direction. These armature-coils are preferably kept short-circuited until they reach a central point most free from the influence of the field-magnet poles, such point, in fact, being the point of the least sparking. By connecting the bars of the commutator together, as shown, all the coils opposite the pole-pieces are short-circuited simultaneously and the circuit therein is broken simultaneously. It will therefore be seen that all of the field-magnet poles act at the same time to produce a rotation of the armature. By this construction the armature-shaft is rotated by two forces, one due to the magnetic attraction between the field-magnet poles and the cores of the armature-coils, the other due to the magnetic repulsion between the poles of the field-coils and the cores of the armature-coils, said repulsion being caused by short-circuiting the coils of the armature at a predetermined point. The direction of rotation of the armature will depend upon the point where the armature-coils are short-circuited. If such coils are short-circuited on one side of the center line of the pole-pieces, the armature will be revolved in one direction, and if short-circuited on the other side of the center line said armature will be revolved in the opposite direction. The direction of rotation will therefore be controlled by the position of the brush $A^5$ and the armature may be reversed by simply moving this brush. I prefer to use a wide brush on the commutator.

When there are more poles in the armature or revolving portion than in the field or stationary portion, the commutator-brush is preferably made wide enough to cover a sufficient number of commutator-segments to keep the coils short-circuited until they reach a position where they are most free from the influence of the fields.

When there is a pole to each field-pole, the brush is preferably as wide as possible to prevent sparking.

It will be seen that by this construction I produce a motor adapted to be operated by a single-phase alternating current, such motor being a self-starting and reversible motor. I have shown in Fig. 3 a machine having a field-magnet pole for every armature-pole, the segments of the armature being all connected together. It will be of course understood that the reason for connecting the segments of the commutator together is to make each pole of the field-magnet and armature act in the same manner and at the same time to produce a rotation of the armature.

As has been before stated, when these machines are started the speed becomes synchronous with that of the generator. In machines having the same number of poles in the armature and field I may use a second brush after the machine has attained a synchronous speed, the said second brush making contact with a ring adjacent to the commutator, the said ring being connected to each bar of the commutator, as shown in Fig. 8. When the motors have reached a synchronous speed, the parts may be moved by hand, so as to continuously short-circuit all the coils. I prefer, however, to have the parts so arranged that this result will be obtained automatically, all of the coils of the armature being short-circuited as soon as the speed of the motor becomes synchronous and being kept so short-circuited until the speed of the motor decreases, the parts being then automatically moved so as to short-circuit the coils at a predetermined time. I have shown mechanism for accomplishing this in Figs. 6, 7, and 8, but it is evident that different mechanisms may be used for the same purpose. All the brushes used on the motor may be carbons and radially disposed, as is well understood, allowing the motor to run in either direction.

In some cases where there is the same number of poles in the armature and field I may move or slide the commutator-brush onto the ring adjacent and connected to the commutator when the machine has attained normal speed, operating the brush by a magnet, as shown in the drawings, the brush working partly on the commutator and partly on the ring when the motor is at normal speed. The motor when constructed in this manner is reversible, and is reversed by changing the position of the main brush on the commutator, the motor being first brought to rest by shutting off the current from the fields. The additional brush for continuously short-circuiting the coils when such a brush is used—as, for example, the brush F, Fig. 6—will of course be moved to an inoperative position when the motor is stopped, so as to allow it to be started up again. The main brush may now be moved by a magnet operating upon it, as shown in Fig. 6, or by mechanical means.

I do not wish to be limited to any particular construction, as any motor will be satisfactory in which an armature of laminated iron with poles is revolved about a laminated field, In machines having wide pole-pieces the pole-pieces are preferably made so wide that as one or more coils pass out another or others pass beneath the pole-piece.

I claim—

1. The combination in a dynamo-electric machine of an armature provided with a series of poles having coils thereon, a series of field-magnet poles arranged around the armature, one end of the coils of the armature being connected together, the other end of each coil being connected to a section of a commutator, and a conducting device associated with said commutator and the connected ends of said armature-coils, said conducting device arranged so as to short-circuit one or more of said armature-coils at a predetermined point.

2. A dynamo-electric machine comprising two or more field-coils, an armature provided with a series of coils provided with cores and connected together at one end, each coil being connected at the other end to a section of a commutator, and a connecting device between said connected ends of the armature-coils and said commutator-sections so constructed as to short-circuit all the armature-coils in equivalent positions with relation to the field-magnets at a predetermined point.

3. The combination in a dynamo-electric machine of an armature provided with a series of secondary coils, having independent cores, a series of field-magnet poles opposed to said armature-cores and provided with coils adapted to be connected with a source of electrical supply, and a connecting device associated with the coils of said armature and adapted to simultaneously short-circuit said coils when in equivalent positions with regard to the pole-pieces, at a predetermined point whereby the armature is rotated part of the time by the magnetic attraction between the field-poles and the cores of the armature-coils, and the remaining portion of the time by the repulsion between said field-magnet poles and the cores of the armature-coils.

4. A dynamo-electric machine comprising an armature provided with a series of coils having cores independent of each other, a series of field-magnet poles opposed to said cores and provided with coils surrounding the same, one end of each of the armature-coils being connected with a collecting-ring on the armature-shaft, the other end of each of said armature-coils connected with its respective segment of a commutator on the armature-shaft, said commutator-segments in equivalent positions with regard to the field-magnets being connected together, a brush bearing upon said commutator, a second brush bearing upon said collecting-ring, and an electrical connection between the two brushes, substantially as described.

5. A dynamo-electric machine comprising two or more field-coils, an armature provided with a series of coils provided with cores and connected together at one end, each coil being connected at the other end to a section of a commutator, and a connecting device between said connected ends of the armature-coils and said commutator-sections so constructed as to short-circuit all the armature-coils in equivalent positions with relation to the field-magnets at a predetermined point, the circuits so constructed that the armature-coils may be all continuously short-circuited when the motor has attained its normal speed.

6. A dynamo-electric machine comprising two or more field-coils, an armature provided with a series of coils provided with cores and connected together at one end, each coil being connected at the other end to a section of a commutator, and a connecting device between said connected ends of the armature-coils and said commutator-sections so constructed as to short-circuit all the armature-coils in equivalent positions with relation to the field-magnets at a predetermined point, the circuits so constructed that the armature-coils may be all continuously short-circuited when the motor has attained its normal speed, and mechanism associated with said circuits and adapted to automatically change them when the motor reaches normal speed so as to keep the armature-coils continuously short-circuited.

7. A dynamo-electric machine comprising one or more field-coils, an armature provided with a series of coils having cores, said coils connected at one end to a ring on the armature-shaft, and at the other end to a section of a commutator, a brush adapted to bear upon said commutator and collecting-ring, said brushes electrically connected together whereby the armature-coils in equivalent positions with relation to the field-magnets are short-circuited at a predetermined point, a system of circuits so arranged that said armature-coils may be continuously short-circuited and a governing device operated by said motor and adapted to change the circuits when the motor has reached normal speed so as to continuously short-circuit said armature-coils.

8. A dynamo-electric machine comprising an armature provided with a series of coils having cores independent of each other, a series of field-magnet poles opposed to said cores and provided with coils surrounding the same, one end of each of the armature-coils being connected with a collecting-ring on the armature-shaft, the other end of each of said armature-coils connected with its respective segment of a commutator on the armature-shaft, said commutator-segments in equivalent position with regard to the field-magnets being connected together, a brush bearing upon said commutator, a second brush bearing upon said collecting-ring, and an electrical connection between the two brushes, and a controlling device associated with the commutator-brush whereby its position upon the commutator may be changed so as to reverse the motor, substantially as described.

9. A dynamo-electric machine comprising an armature provided with a series of coils having cores, a series of field-magnet poles opposed to said cores, and provided with coils surrounding the same, one end of each of the armature-coils being connected to a collecting-ring on the armature-shaft, the other end of each of said armature-coils connected with its respective segment of a commutator on the armature-shaft, the commutator-segments in equivalent positions with relation to the field-magnets being connected together, a brush bearing upon said commutator, a second brush bearing upon said collecting-ring, and an electrical connection between the two brushes, a governor operated by the motor-shaft and provided with a contact adapted to be moved as the speed of the motor varies, a second contact associated with the movable contact, the governor and contacts so arranged that said contacts are brought together when the motor reaches a normal speed, a connection between said collecting-ring and one of said contacts, the other contact being connected to a brush normally bearing on a ring associated with the commutator so as to electrically connect the segments thereof together whereby all the armature-coils will be continuously short-circuited when the motor reaches a normal speed.

GEORGE EDENSOR DORMAN.

Witnesses:
DONALD M. CARTER,
FRANCIS M. IRELAND.